(12) United States Patent
Jauffred et al.

(10) Patent No.: US 8,285,583 B2
(45) Date of Patent: Oct. 9, 2012

(54) CONTACT STREAM OPTIMIZATION USING FEC AND CC CONSTRAINTS

(75) Inventors: Francisco Jauffred, Weymouth, MA (US); Mukul Goyal, Walpole, MA (US); Glen Osterhout, Somerville, MA (US); Ruby Kennedy, Bedford, MA (US); Robert Crites, Mechanicsburg, PA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/354,831

(22) Filed: Jan. 20, 2012

(65) Prior Publication Data

US 2012/0185326 A1    Jul. 19, 2012

Related U.S. Application Data

(63) Continuation of application No. 11/970,776, filed on Jan. 8, 2008, now Pat. No. 8,135,608.

(51) Int. Cl.
*G06F 17/00* (2006.01)

(52) U.S. Cl. .................................................. 705/7.33
(58) Field of Classification Search .............. 705/7.33
See application file for complete search history.

(56) References Cited

U.S. PATENT DOCUMENTS

| | | | |
|---|---|---|---|
| 6,993,493 | B1 | 1/2006 | Galperin et al. |
| 2003/0110119 | A1 | 6/2003 | Crites |
| 2004/0073496 | A1 | 4/2004 | Cohen |
| 2007/0094060 | A1 | 4/2007 | Apps et al. |
| 2008/0300981 | A1 | 12/2008 | Crites et al. |

OTHER PUBLICATIONS

Crites, et al., "FEC MIN Integration for ACO," U.S. Appl. No. 60/941,355, filed Jun. 1, 2007.

*Primary Examiner* — Thomas Dixon
(74) *Attorney, Agent, or Firm* — Cuenot, Forsythe & Kim, LLC

(57) ABSTRACT

Methods, systems, and software for conducting a marketing campaign are described. One or more scores associated with sending offers to proposed contacts are received; and an overall campaign score corresponding to a sum of the scores is optimized to generate optimal assignments of offers to customers. The optimal assignments are included in the marketing campaign.

21 Claims, 7 Drawing Sheets

CONTACT STREAM OPTIMIZATION USING FEC AND CC CONSTRAINTS

CROSS-REFERENCE TO RELATED APPLICATIONS

This application is a Continuation of U.S. application Ser. No. 11/970,776, filed on Jan. 8, 2008.

BACKGROUND

This invention relates to contact stream optimization, and more particularly to determining assignments of offers to customers for a marketing campaign.

In a marketing campaign, combinations of different possible offers (e.g., advertisements, and promotional offers) may be sent to individuals identified as potential customers. Marketing campaign optimization typically takes a set of possible offers and a set of potential customers, along with the characteristics and constraints of the marketing campaign, one or more scores (any numeric value that represents the relative value of giving a particular offer to a particular recipient) and determines which offers should go to which customers to maximize the sum of scores of the surviving transactions. The result of the marketing campaign optimization may be a listing of offers assigned to individual potential customers. This listing is referred to as a "contact stream."

SUMMARY

According to one aspect, the invention features a method including receiving one or more scores associated with sending offers to proposed contacts belonging to a pool of customers; and optimizing an overall campaign score corresponding to a sum of the scores to generate optimal assignments of offers to customers that satisfy for-each-customer (FEC) constraints and cross-customer (CC) constraints. The FEC constraints control communication to an individual customer and the CC constraints represent resources shared among the pool of customers. The optimal assignments are included in the marketing campaign.

According to another aspect the invention features a computer readable medium having stored thereon, software for conducting a marketing campaign, the software comprising instructions for causing one or more processors to receive one or more scores associated with sending offers to proposed contacts belonging to a pool of customers and optimize an overall campaign score corresponding to a sum of the scores, wherein optimizing generates optimal assignments of offers to customers that satisfy for-each-customer (FEC) constraints and cross-customer (CC) constraints, the FEC constraints controlling communication to an individual customer and the CC constraints representing resources shared among the pool of customers, the optimal assignments being included in the marketing campaign.

According to another aspect, the invention features a system including memory configured to store one or more scores associated with sending offers to proposed contacts belonging to a pool of customers; and one or more processors configured to optimize an overall campaign score corresponding to a sum of the scores. The optimizing generates optimal assignments of offers to customers that satisfy FEC constraints and CC constraints.

Embodiments may include one or more of the following. The method may include dividing (e.g., randomly) the pool of customers into groups; determining a first assignment of offers for a first group of customers that maximizes a sum of scores for the first group and complies with the FEC constraints and the CC constraints; and determining subsequent assignments of offers for the remaining groups using information associated with determining the first assignment, the subsequent assignments maximizing the sums of scores for the remaining groups and complying with the FEC constraints and the cross-customer constraints, the optimal assignments including the first assignments and the subsequent assignments. The overall campaign score may be maximized iteratively with respect to the CC constraints (using linear programming or integer programming); and with respect to the FEC constraints until a stop condition is met, e.g., in response to determining that no new assignments have been added to the pool of assignments. The scores associated with the assignments in the pool may be modified using calculated dual values (e.g., Lagrangians) that indicate whether the assignments comply with the CC constraints. The FEC constraints may include one or more of: a minimum number of offers; a maximum number of offers, incompatible offers; limits on the number of offers and/or packages sent to a customer over a specific time period, using a particular channel, and of a certain offer type; and a specific sequence of offers required for one or more of the customers. The resources represented by the CC constraints include one or more of: budget, offer capacity, channel capacity, a minimum average FICO score, and a maximum sum of risk score.

Some aspects and embodiments may provide one or more of the following advantages.

Contact-stream optimization is solved in a scalable fashion while preserving the robust needs of a marketing campaign. Optimal and nearly optimal solutions are generated with unlimited cross-customer (CC) capacity constraints and unlimited for-each-customer (FEC) constraints, and sliding time windows for enforcing spacing requirements (e.g., to reduce contact fatigue or manage channel capacity). The optimization maximizes (or minimizes) the sum of scores based on a specified scoring field S, which exists for each proposed contact and may represent any relevant marketing metric (e.g., profit, probability of response, expected profit, revenue, customer short-term or long-term value, customer loyalty, etc.). CC constraints can operate on a specified score field C (C may also be a calculated value computed over multiple fields/using multiple inputs), which can be different from the overall optimization score S, (e.g., representing cost or risk) using an aggregation operator (e.g., count, sum, or average) and specifying a mathematical equation using a threshold value T (e.g., Sum or average of C in the final solution must be $>, >=, <, <=, =$ to T). When determining an optimal solution, the solver can consider CC constraints and FEC constraints simultaneously. The scalable nature of the optimization approach enables solutions to be determined quickly and efficiently on systems having varied computational resources. Furthermore, the optimality of the result vs. the run time (i.e., the time it takes to generate the solution) can be tailored for different systems and applications. For example, in some situations, it may be more desirable to reduce the optimality of the result to decrease the run time required for obtaining the result. Tuning parameters to the optimization approach can be adjusted manually or automatically to achieve desired outcomes (e.g., execution time completes within a specific environment in less than X hours). The techniques automatically consider both an individual's contact history and proposed future contacts to consider a customer-centric, in addition to a business-oriented perspective, to contact stream optimization.

The details of one or more embodiments are set forth in the accompanying drawings and the description below. Other features, objects, and advantages of the invention will be apparent from the description and drawings, and from the claims.

DETAILED DESCRIPTION

Figure 1:
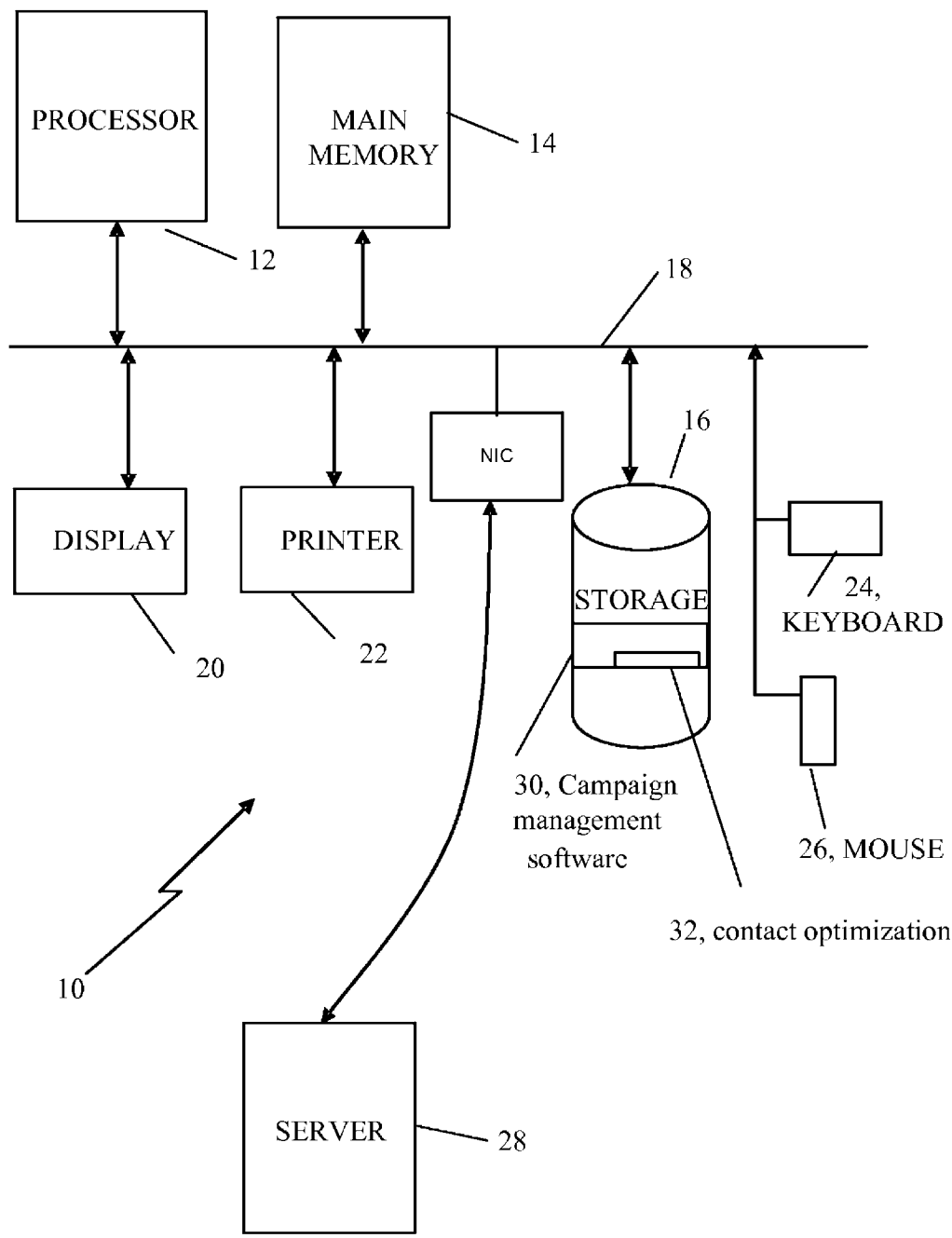
FIG. 1 is a block diagram of a system for executing contact-stream optimization.

Contact-stream optimization (also referred to as "campaign optimization") begins with a set of marketing offers, which can include messages, advertisements, and promotional offers, and a pool of potential recipients (also referred to as "customers"), which may include existing customers and/or new individuals/prospects. The offers are produced independently of the optimization process and typically have a number of characteristics (costs, delivery channel, risk, etc.). For each of the offers, the process calculates a score (scores may be positive or negative) that represents the relative "value" of assigning any particular offer to any individual customer. The score can take a number of forms, including the probability that the customer will respond to the offer or an expected value of the offer for the customer. The potential list of contacts is the "proposed contact list" and may include all permutations or a subset of permutations (i.e., an external system may apply eligibility rules to the list reduce the number of proposed contacts to consider for optimization).

The set of assignments of offers to customers in the customer pool represents a solution, and the sum of scores corresponding to the assignments is referred to as the "overall campaign score." Campaign optimization seeks to find a solution that optimizes the overall campaign score while satisfying a given a set of rules/constraints (hereinafter rules and constraints are used synonymously). In other words, a set of assignments is considered to be optimal if the set maximizes the overall campaign score while honoring all constraints. The details of the optimization process are described further below.

An assignment of one or more offers will obey two types of rules, among other rules, for-each-customer (FEC) rules and cross-customer (CC) capacity constraints. FEC rules are customer-specific and may be different from customer to customer (as different customers may belong to different customer sets/segments and rules may be produced by customer segment). FEC rules are evaluated in the context of a single customer at a time, looking only at the proposed contacts and contact history for that single customer. Examples of FEC rules include, but are not limited to, a maximum or minimum number of offers or packages for a particular customer on one or more channels within a defined time period, incompatible offers (e.g., invalid combinations of offers), specific sequences of offers (e.g., a telephone follow-up call can only be sent if the original direct mail offer is also sent, and a "positive" offer must be spaced a minimum number of days after any "negative" offer).

FEC rules may also impose limits on the number of offers sent to a customer over a specific time period (e.g., a fixed or sliding time window), using a particular channel, and/or of a certain offer type. These types of FEC rules reduce or eliminate contact fatigue so that, among other reasons, customers do not feel bombarded with offers. The limits imposed by the FEC rules vary among customers. FEC and CC rules may limit their application based on various other dimensions (e.g., customer segments, channels, offer sets, cost/budget, and/or time). For example, an FEC rule could specify that customers that have never before responded to an email offer cannot receive more than three type-A offers using the email channel over any (rolling) 30-day period.

Cross-customer (CC) constraints are global in nature and represent a shared resource for customers in the campaign, e.g., budget, offer capacity, or channel capacity and/or other goals for the campaign to meet (using multi-dimensional scores), for example a minimum average credit score such as FICO® (Fair, Isaac, Incorporated) score or maximum sum of risk score in a campaign sending out credit offers.

Contact-stream optimization returns a list of contacts and assignments of offers to those contacts. The assigned offers may then be sent to the contacts on the list as part of a promotional campaign.

Referring now to FIG. 1, a system 10 includes a CPU 12, main memory 14 and persistent storage device 16 all coupled via a computer bus 18. The system 10 also includes output devices such as a display 20 and a printer 22, as well as user-input devices such as a keyboard 24 and a mouse 26. Not shown in FIG. 1, but necessarily included in a system of FIG. 1, are software drivers and hardware interfaces to couple all the aforementioned elements to the CPU 12.

The computer system 10 also includes automated campaign management software 30 that operates with contact optimization software 32 to prioritize offers sent to multiple contacts based on given criteria. The contact optimization software 32 executes a scalable algorithm that simultaneously considers different constraints, and which can find a solution (i.e., assignments of offers to customers) that is optimal or nearly optimal and that complies with all of the applied constraints and inputs (e.g., a set of proposed contacts or customer/offer pairs). The contact optimization software 32 can render a visual representation of customer/offer assignments on the display 20 or printer 22 to provide a decision-maker or the automated campaign management software 30 with the results. The results that are returned can be based on different algorithm types or different sets of parameters used with the same algorithm.

The automated campaign management software 30 and contact optimization software 32 may reside on the computer system 10, as shown, or may reside on a server 28 that is coupled to the computer system 10, e.g., over a network through a network interface card (NIC), in a conventional client-server arrangement. Databases that supply data to the campaign management software 30 and contact optimization software 32 can reside on the storage 16 on a storage device (not shown) associated with server 28 or as networked-based databases that are accessed by the client 10 and/or the server 28, as appropriate and as would be known to one of ordinary skill in the art.

Figure 2:
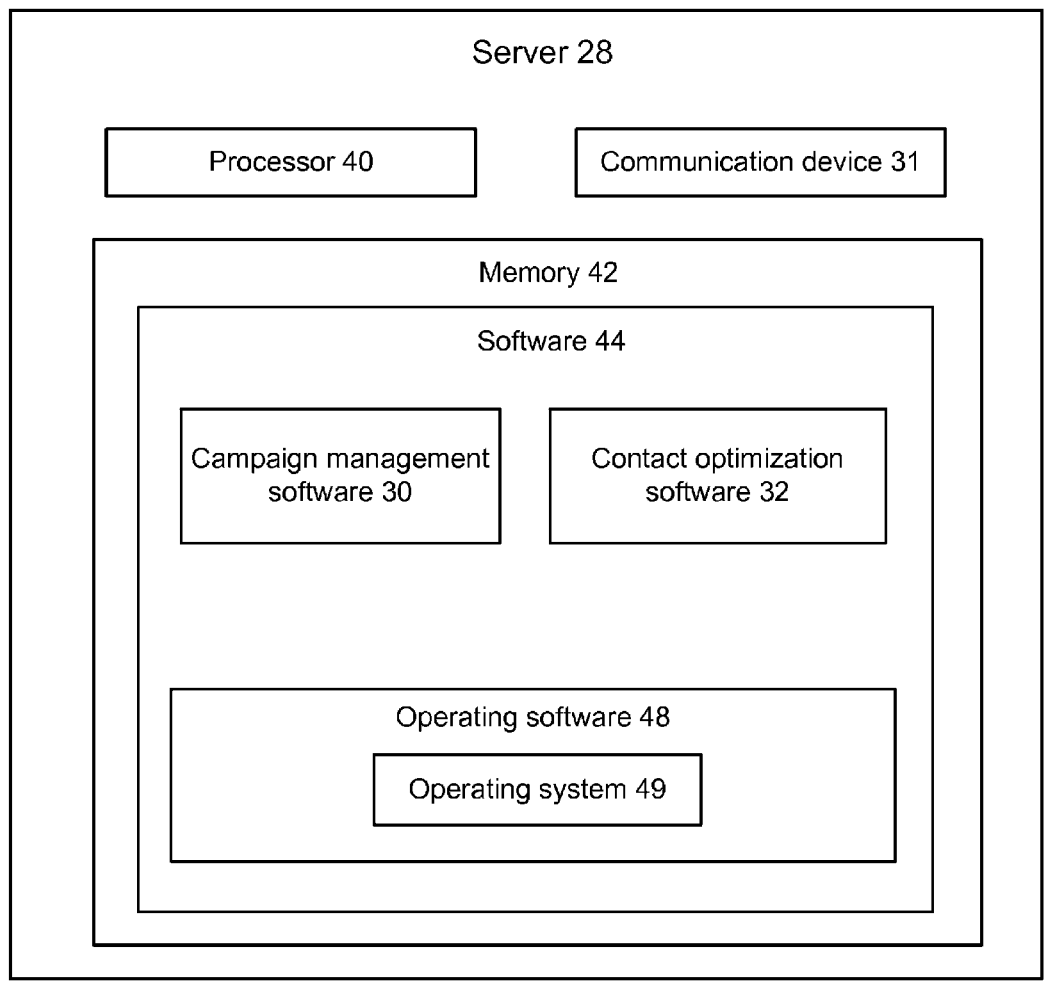
FIG. 2 is a block diagram of a server.

Referring to FIG. 2, a server 28 may be any type of computing device or multiple computing devices. Server 28 includes one or more processor(s) 40 (referred to simply as "processor 40"), a communication device 31, and memory 42 that stores software 44 to be executed by the processor 40. The server 28 also includes storage (not shown). Communication device 31 facilitates communication between the server 28 and clients (such as system 10 (FIG. 1) coupled to a network (e.g., a LAN and/or WAN, such as the Internet)). Software 44 includes the campaign management software 30 and contact optimization software 32, which may be downloaded from the storage device 16 and run on the server 28. The server 28 also includes an operating system software environment 48 that includes, but that is not necessarily limited to, an operating system 49, such as Windows 2003®.

Figure 3:
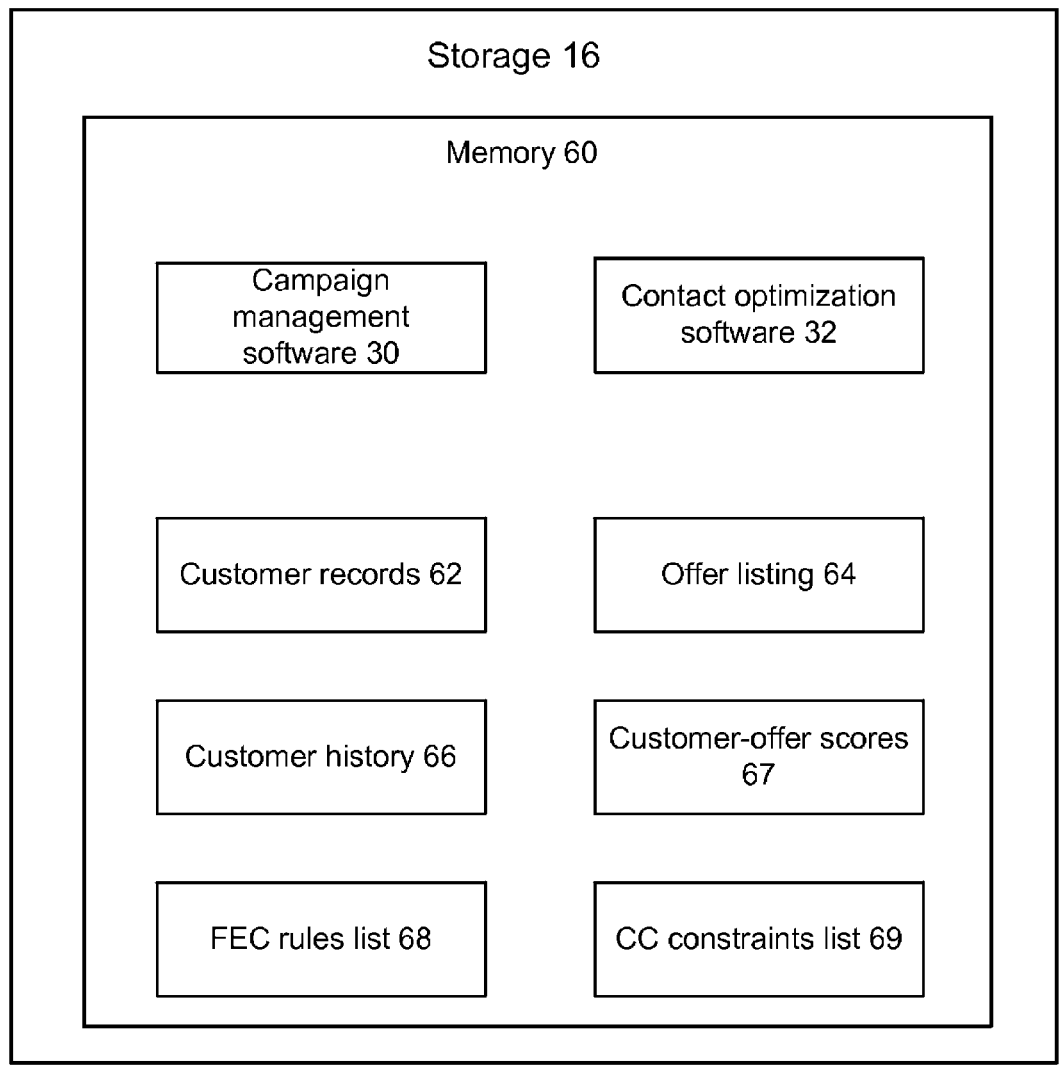
FIG. 3 is a bock diagram of a storage device.

Referring to FIG. 3, the memory 60 has resident therein the campaign management software 30 and contact optimization software 32 that executes the optimization process. The memory also can include input data used by the optimization process. This data includes customer records 62 for a pool of customers to be considered as contacts for a marketing campaign; a listing of offers 64 to be provided to the customers; and customer history 66 for one or more customers in the pool. The data may further include a list of customer-offer pairs (i.e., some of the eligibility constraints may be applied prior to the optimization process), though in general, the list does not include all combinations that may be represented. The customer history 66 is used by FEC rules or CC constraints when evaluating potential offers over time. The customer history 66 stores a complete record of all previous contacts made to customers, including any relevant data for optimization (e.g., offer, offer attributes, contact date, contact channel, contact cost, etc.). For optimization, there is a set of customer-offer scores 67. The customer-offer scores 67 can be independently calculated (e.g., using a predictive model), based on rules (e.g., data base calculations or derived fields from the campaign management software 30), or provided by a user in the contact optimization software 32. An FEC rules list 68 contains all applicable FEC rules for the current campaign and a CC constraints list 69 contains all applicable CC constraints for the current campaign.

Figure 4:
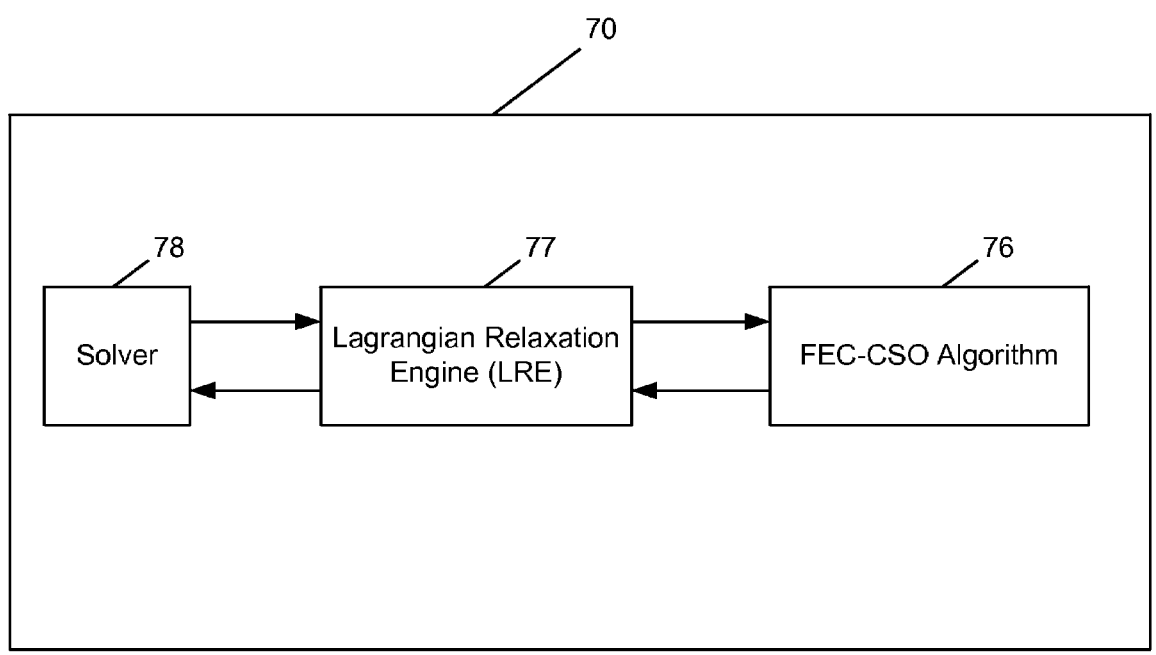
FIG. 4 is a block diagram of a column-generation process.

Referring to FIG. 4, the optimization software 32 includes the following components for performing a column-generation process 70: a solver 78, a Lagrangian relaxation engine (LRE) 77, and an algorithm that is directed to solving contact optimizations for each customer, e.g., an FEC-based contact stream optimization 76 (FEC-CSO) as described in application Ser. No. 10/015,548, filed Dec. 11, 2000, and entitled "Method for Contact Stream Optimization," the contents of which are incorporated herein by reference in their entirety.

As will be described in further detail below with respect to FIGS. 5A-5C, an optimization process 80 uses the column-generation process 70 to solve a combinatorial problem in which each variable represents assignments of offers or bundles of offers to customers in an initial solution.

In brief, the column-generation process 70 includes iteratively optimizing the solution with respect to (1) the FEC rules using the FEC-CSO algorithm 76 and (2) the CC constraints using the solver 78, which operates as a linear programming (LP) solver, an integer programming (IP) solver, or a combination of both. The solution from the solver 78 is rescored by the LRE 77 using values produced by the solver 78 and input to the FEC-CSO algorithm 76. Based on the input, the FEC-CSO algorithm 76 determines an optimal solution with respect to the FEC rules, and that solution is sent to the solver 78 via the LRE 77. In this manner, the solution to the problem is iteratively optimized with respect to both the FEC rules and CC constraints by the FEC-CSO algorithm 76 and the solver 78, respectively, until an optimal solution that satisfies both the FEC rules and CC constraints is determined. The LRE 77 determines the stop condition (e.g., when no new alternatives are added to the pool of alternatives by the FEC-CSO algorithm 76).

The rules imposed on the optimization problem fall into the following categories: exclusion rules, CC constraints, and FEC rules. Exclusion rules are efficiently implemented at the database query level to select the subset of proposed assignments that undergo further optimization. Rules that apply to all customers are processed at the LRE/Solver level. As described above, FEC rules apply at the per-customer level and are handled in the FEC-CSO algorithm 76.

Both FEC rules and CC constraints specify an interval of time, referred to as a "window," constraining the rule (e.g., to control offer spacing to reduce the possibility for contact fatigue, among other purposes). Windows can be static (referencing a specific fixed set of dates such as Jan. 1, 2007-Jan. 31, 2007) or "dynamic/sliding/rolling" which is interpreted as any time period of the specified length, typically within start and end date boundaries. Sliding windows are typically more relevant to marketers. For example, a rule stating a maximum of one offer is allowed in January and one offer in February would not preclude an offer given to an individual on January $31^{st}$ and February $1^{st}$, even though these are two consecutive calendar days. A more meaningful interpretation/implementation of the rule, invoking sliding windows, would say that only one offer is allowed in any 30-day window. Windows are can be efficiently determined by the time interval specified in the rule, and by the dates of proposed offers and contact history to which the rule applies. In the case of FEC rules, the windows may be specific to a particular customer. For CC rules, the windows may be applicable to all customers or a subset of customers.

The FEC rules are translated into "internal" rules, or rules that the FEC-CSO algorithm can process. FEC-CSO Examples of internal rules include:

MAX Transactions

MAX Transaction Sets

MIN Transactions where a transaction is the intersection of an offer, customer, channel, and date. Each proposed offer is a transaction, because it is proposed to a particular person on a particular channel on a particular date. The following list provides examples of specific FEC rules applied to sets of transactions A and B, and the internal rules derived from the FEC rules.

a) Never Combine A with B:

Since A and B can specify sets of transactions, this FEC rule is represented by the MAX Transaction Sets internal rule, with MAX=1. If there is a time interval specified, there will be one of these internal rules per relevant time window. If the same transaction belongs to both sets, that transaction is rejected. If a particular customer only has transactions from set A or from set B (but not both) in their proposed transactions and contact history, no internal rule is needed.

b) Never A Followed by B:

For each transaction B, find the oldest preceding transaction A that fits in the time interval. The date of that transaction A marks the left-edge of a time window. All A transactions to the left of the target transaction B, and all B transactions to the right of the target transaction B in the time window (including the target transaction B itself) are used to produce a "Never A With B" internal rule. This process is repeated for each transaction B, merging duplicate transactions. If a particular customer only has transactions from set A or from set B (but not both) in their proposed transactions and contact history, no internal rule is needed.

c) B only with A:

If there are no A transactions in the time window, all B transactions in that time window should be deleted.

d) Min/Max Offers:

This FEC rule can be split into a MAX Transactions internal rule and a MIN Transactions rule. The number of these rule pairs is multiplied by the number of relevant time windows if there is a time interval specified.

e) Max Duplicate Offers:

There is one MAX Transactions internal rule produced for each distinct offer in the proposed transactions, multiplied by the number of relevant time windows if there is a time interval specified.

f) Max Packages:

This FEC rule is turned into a MAX Transaction Sets internal rule operating on packages (counting customer interruptions rather than offers). There is only one internal rule per relevant time window if a time interval is specified.

Figure 5A:
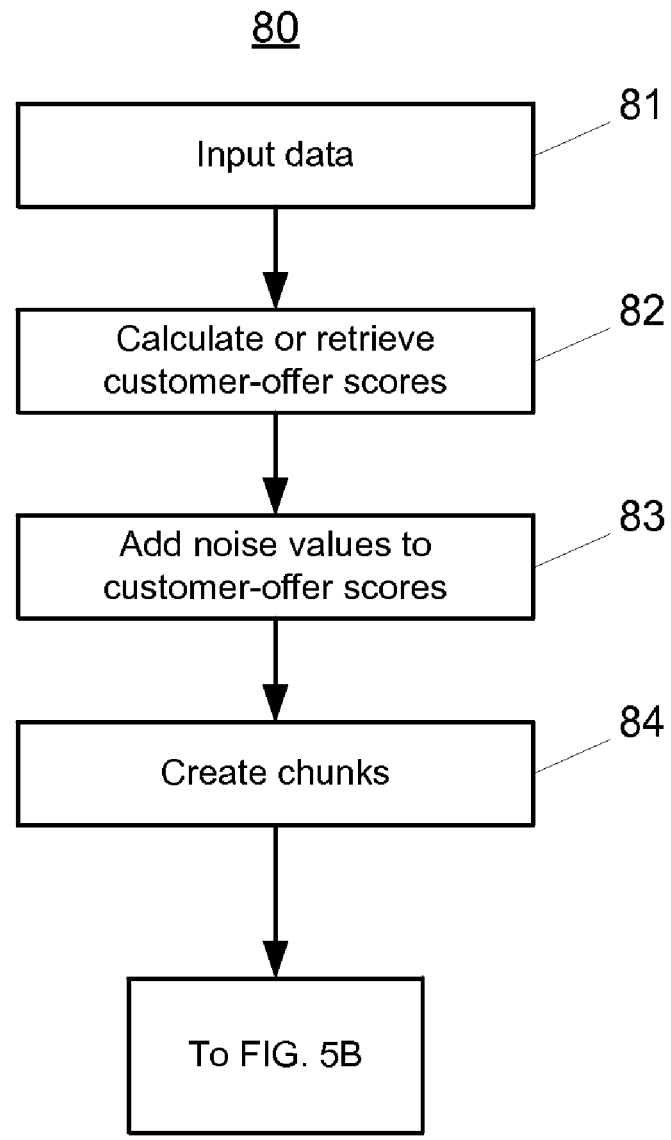
FIGS. 5A-5C are flowcharts representing a contact-stream optimization process.
Figure 5B:
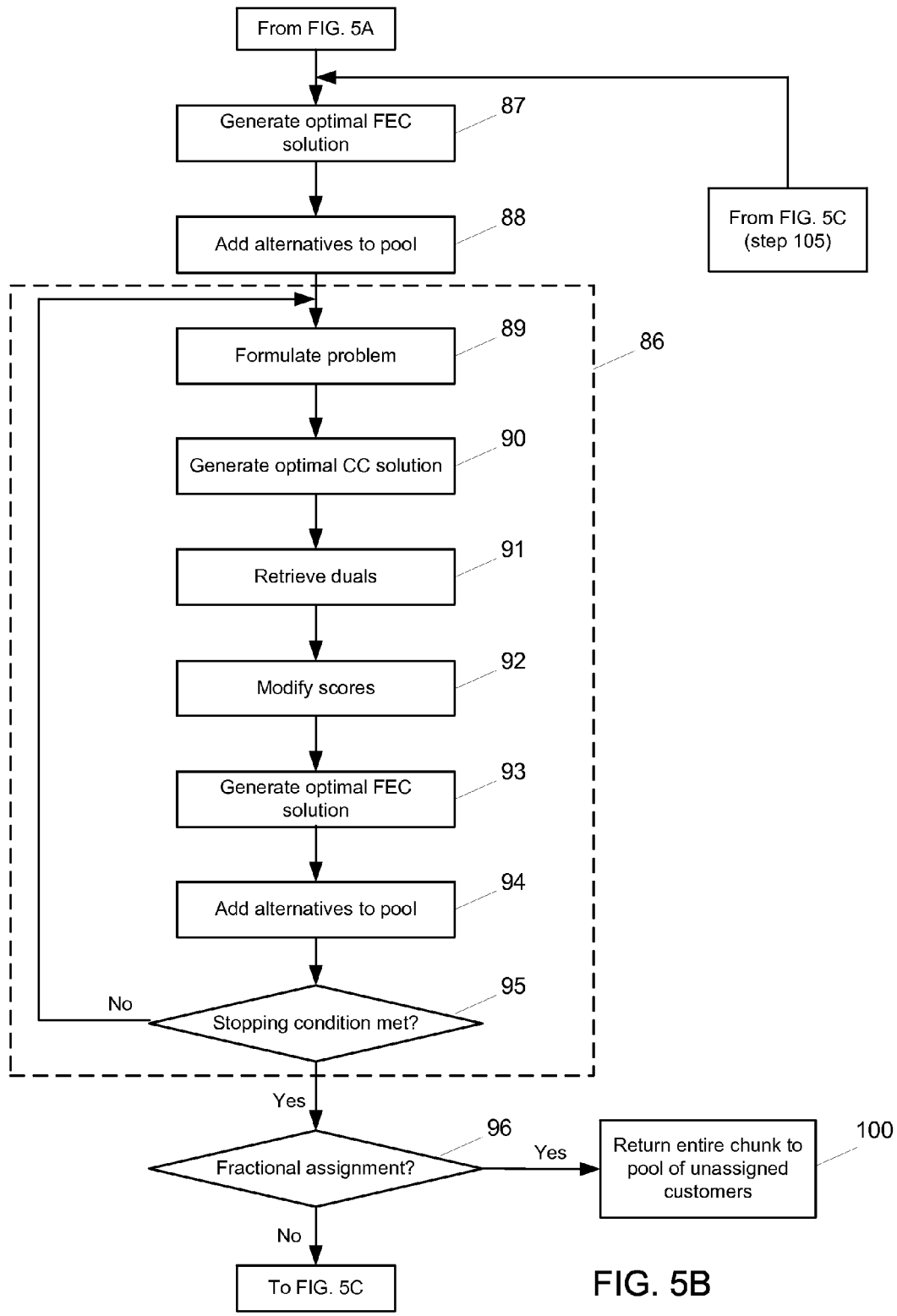
Figure 5C:
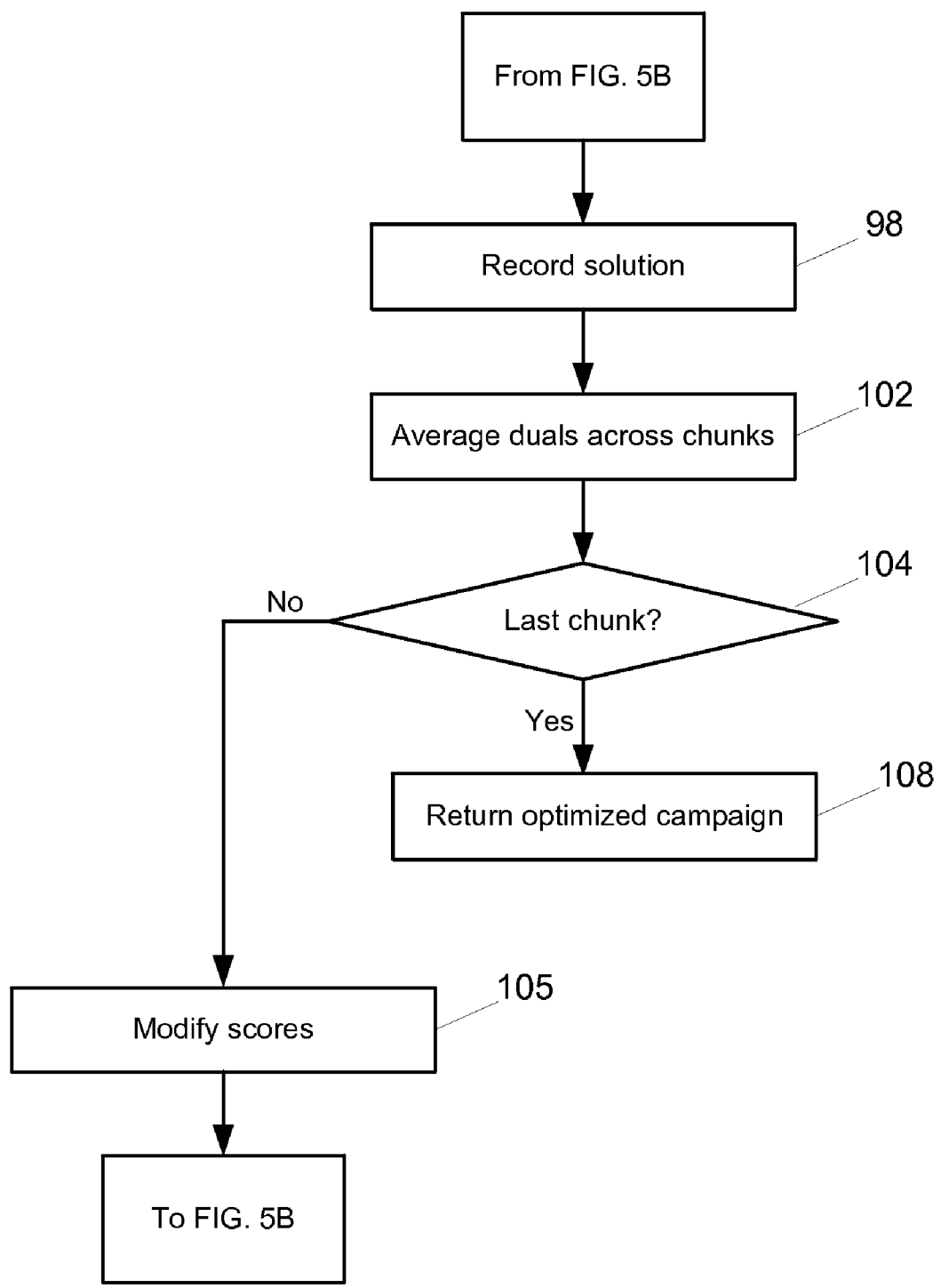

Referring to FIGS. 5A-5C, the optimization process 80 is described in further detail, when executed on the server 28. The process 80 inputs (81) data including customer records 62 associated with a pool of customers to be considered for the campaign; customer history 66 for customers in the pool; and an offer listing 64, which lists offers that could potentially be sent to the customers. Using the data, the process 80 calculates or retrieves (82) customer-offer scores for each of the offers with respect to each of the customers in the pool. In some embodiments, each offer has a predictive model associated with it that produces a score when a customer record for a customer in the pool is fed to the model. Alternatively, the customer-offer scores are pre-calculated or pre-specified, in which case the process 80 retrieves the scores rather than calculating the scores directly.

A small random value (referred to as a "noise value") is added (83) to all customer-offer scores to differentiate the customer-offer scores from each other. The amplitude of the noise value is selected to be small in comparison to the magnitude of the scores (i.e., the injection of noise should not change the relative ordering of any scores/transactions). The noise value is calculated by multiplying the score by the amplitude of a uniform distributed random variable between zero and some maximum value lambda. The maximum amplitude lambda is either automatically computed from the data or is a user-defined parameter (e.g., between zero and one). An amplitude of zero, for example, results in a noise value of zero and thus the scores would remain unchanged. An amplitude value of one, on the other hand, on average, increases the scores by 0.5.

The process 80 divides (84) the customer pool randomly into groups or "chunks" of configurable size or number (e.g., size or number specified by a user or calculated based on available memory in the system 42). All customers are equally likely to be assigned to any particular chunk (e.g., randomly assigned), and any pair of customers has the same probability to be assigned to the same chunk. All transactions for a particular customer (i.e., proposed offers to a particular customer) are optimized along with any contact history associated with the customer within the same chunk.

The process 80 selects one of the chunks, and for each customer in the chunk, the process 80 determines (87) a set of offer assignments that honors all FEC rules for that particular customer. Such an offer assignment included in the set is referred to as an "alternative." An alternative may include zero offers, a single offer, or a combination or sequence of offers. Any given customer could have one or more alternatives generated by combinatorial methods. To control the time it takes to complete the optimization, users can set parameters to limit the generation of alternatives to only a partial set of alternatives meeting a user-defined criterion. The alternatives for each customer are mutually exclusive. Therefore, the final result will include exactly one alternative for each customer. An example pseudo code for generating alternatives is provided in the Implementation Details section below. Each alternative has an associated score that is calculated as the sum of customer-offer scores of the offers included in the alternative.

After the first set of alternatives have been generated (87) for the first chunk by the FEC-CSO algorithm 76 using FEC rules 68, the Lagrangian relaxation engine (LRE) 77 adds any newly generated, unique alternatives to the existing pool of alternatives (88). For ease of explanation, the solutions produced by the FEC-CSO algorithm 76 are referred to as "FEC optimal solutions."

The LRE 77 sends the pool of alternatives and the rescored (e.g., scaled) CC constraints 69 to the solver 78, which in turn, formulates (89) a problem (e.g., an LP or IP problem) that includes an objective function in which each variable of the objective function represents an alternative in the initial solution and problem constraints which include the CC constraints scaled by the number of chunks (e.g., if a rule states that a maximum of 1,000 of offer X may be given out and customers are randomly divided into 10 chunks, each chunk would be limited to a maximum of 100 of offer X). The set of alternatives supplied in the pool may not be sufficient to meet all the CC constraints applicable to the chunk. To take into account the potential violation of those CC constraints that cannot be met by the alternatives, the formulation introduces an artificial variable for each min CC and max CC constraint. These artificial variables are generated for the min and max CC constraints and may have a very high negative penalty in the objective function to ensure that the solution complies with the CC constraints as best as possible. The solver 78 generates (90) an optimal (or near-optimal) solution with respect to the CC constraints. For ease of explanation, solutions produced by the solver 78 are referred to as "CC optimized solutions."

To generate an optimal result for the chunk with respect to the CC constraints, a "column generation" process 70 is invoked. Column generation is a known technique for solving large-scale combinatorial optimization problems. A detailed description of column generation can be found in chapter 11 of: Laurence A. Wolsey, *Integer Programming*, Wiley-Interscience; 1 edition (Sep. 9, 1998). With the solution, the solver 78 produces a value, called a "dual," that represents the optimal Lagrangians for the CC constraints. The terms "dual," "Lagrangian," and "Lagrangian multiplier" may be used interchangeably.

The solver 78 uses linear programming (LP), integer programming (IP), or a combination of both LP and IP to find a solution to the problem. The user specifies which of the programming techniques (or other techniques) to use or the system selects the technique based upon parameters (e.g., maximum run time) specified by the user. For example, the user may provide a solution time for the chunk, so that when the time limit is reached the solver will stop and return the current solution. Both solvers will produce as an output, assignments of alternatives for each customer. Sometimes, in the case of the LP, fractional assignments of multiple alternatives are returned for a single customer (these would need to be subsequently post-processed in a separate step 96). The LRE 77 retrieves the dual values (91) for the scaled CC constraints for each customer in the chunk. In the IP case, those values will be retrieved from the node zero problem, in the LP case, from the final solution.

The LRE 77 modifies (92) the scores 67 associated with the proposed contacts for the chunk. The modified scores of the proposed contacts 67 and the FEC rules 68 are passed from the LRE 77 to the FEC-CSO algorithm 76, as discussed above. As was done in step 87, the FEC-CSO algorithm generates (93) the optimal alternative, for each customer that given the FEC rules 68. The alternatives generated at this time could be different than the ones that were previously generated, as their scores have been modified by the dual values produced by the solver 78. The new alternatives generated by the FEC-CSO algorithm 76 are passed to the LRE 77 and the LRE 77 adds (94) any new (unique) alternatives to the pool of alternatives. The LRE 77 passes the entire pool of alternatives and the rescored (e.g., scaled) CC constraints to the solver 76 which finds an optimal solution with respect to the CC constraints in the manner described above. At each iteration of the column-generation process 70, new alternatives are added to the LP or IP master problem considered by the solver 78. These new alternatives have a positive, reduced score (e.g., a score that is lower than the score of previously considered alternatives) and they are FEC optimal for the current set of dual values. In some implementations, a cover constraint for each customer is added to the master problem, and the dual value of this constraint represents a threshold that the Lagrangian modified scores of any new alternative should meet to be added to the alternative pool.

The process 80 continues performing iterations until the process 80 determines (95) that a stop condition has been met. For example, a stop condition is met when the FEC-CSO algorithm 76 is unable to find any new (unique) alternatives when producing an FEC optimal solution. Other stopping conditions include, but are not limited to, determining that (1) a predetermined number of iterations have been performed, (2) a change between the duals produced from the previous iteration and the current iteration is below a predefined threshold, or (3) the percentage change between the duals produced from the previous iteration and the current iteration is below a predefined threshold.

All alternatives that were selected fully by the solver 78 when generating the final chunk solution will be recorded (98) into, e.g., the storage device 16 or storage device (not shown) of the server 28 as part of the campaign and the assignment of a customer to an alternative is considered to be solved. In some cases, the variables representing an alternative may have a fractional value or no value after a final result to the chunk has been generated. Offers typically cannot be fractionally assigned, therefore, if the process determines (96) there are customers with partial assignments or no assignments, the process 80 returns (100) the entire chunk of customers to the unassigned customer pool. In some embodiments, the process 80 forces the solver 78 to obtain a final assignment of alternatives for those customer chunks found to have customers with partial assignments by optimizing the solution using integer programming in the last iteration for the chunk.

The dual values obtained after the final chunk solution has been obtained are the chunk-optimal Lagrangians and they can be used to initialize the remaining chunks produced in step 84 to speed up solutions for these remaining chunks. As shown in FIG. 5C, the dual values of a chunk may be averaged (102) with dual values determined for any previously solved chunks.

After a solution for the chunk has been obtained, the process 80 clears the alternative pool and selects a subsequent chunk to process. The iterative process (86) is performed on a subsequent chunk in the same manner as the first chunk; however, before sending the proposed contacts, customer-offer scores, and FEC rules to the FEC-CSO algorithm 76, the LRE 77 modifies (105) the scores of the proposed contacts for the subsequent chunk by the average duals obtained for the previous chunks. For the first chunk, the average duals were assumed to be zero; therefore, the initial scores for the alternatives (produced in step 87) are not modified before they are sent to the FEC-CSO algorithm 76 for the first time. For the second chunk, the initial scores for the alternatives are modified by the dual values obtained for the first chunk. The chunks may be processed in parallel or serially while keeping track of the changes in the Lagrangians. The remaining chunks are processed up to and including the last chunk (104). In some embodiments, the user may specify processing of only a subset of the total number of chunks (e.g., the first five out of ten).

After determining (104) that the last chunk has been processed, the process 80 returns (108) an optimized campaign which includes an assignment of offers for each customer from the customer pool.

The process 80 processes all customers through the LP/IP (integer programming) solution of chunks. Nevertheless, a user may decide to only solve for the optimal duals 90 for a small number of chunks in order to speed the process and to give more emphasis to the FEC-CSO algorithm 76 over the LP/IP solver 78. No provision is made by the process 80 to make sure that the number of customers selected for a particular chunk is a statistically significant sample. If a statistically significant sample is desired, it is up to the user to use a statistically significant sample or sufficient chunks whose additive sum can provide a stable set of Lagrangians.

The software 30 and 32 provides the user with the flexibility to exert control over optimality vs. run time with various configuration parameters. For example, places in the optimization process 80 where non-optimality may be introduced include the following.

1. Production of multiple chunks: configuration parameters may be provided to the user to control the maximum size of a chunk or the number of chunks. The larger the size of a chunk or the fewer the chunks used, the more optimal the results, but the longer the execution time.

2. Non-random groups of customers: the optimization approach assumes relatively even distribution of proposed contacts along key constraint dimensions (e.g., customers that have been proposed offer X are evenly distributed among all chunks and are not significantly skewed by falling all into a single chunk). A random number seed can be specified by the user to control the sizes of the groups and their customer assignments. Automated detection methods can be used to ensure randomness along key dimensions.

3. Column generation does not rapidly converge: a configuration parameter may be provided for controlling the maximum number of iterations that are executed waiting for no new alternatives to be generated 4. Solver non-optimal: the solver 78 may include commercially available components that provide near-optimal solutions.

The optimization process 80 may include the following additional features and enhancements. The FEC rules and/or CC constraints may determine which channels can be used to contact customers. Examples of channels include direct mail, email, telephone, web, kiosks, SMS, and fax. The software 30 or 32 may include an audit logging process that collects information about which FEC rules and CC constraints get credit for eliminating specific transactions. For example, the process may show which offers had their score modified and how they were modified, e.g., by different CC constraints. Reporting may capture analysis of pre- and post-optimization results along the customer, offer, channel, budget, and time dimensions.

Implementation Details

The following mathematical model may be used to implement the solver 78.

$$\max \sum_{c \in Customers} \sum_{\alpha \in Alternatives(c)} s_{c,\alpha} x_{c,\alpha}$$

s.t.

Cover: $\sum_{\alpha \in Alternatives(c)} x_{c,\alpha} = 1 \; \forall \, c \in Customers$ Max Transactions:

$$\sum_{c \in Customers} \sum_{\alpha \in Alternatives(c)} \delta_{c,\alpha,r} x_{c,\alpha} - p_r \le v_r \; \forall \, r \in CCMinMaxRules$$

Min Transactions:

$$\sum_{c \in Customers} \sum_{\alpha \in Alternatives(c)} \delta_{c,\alpha,r} x_{c,\alpha} + q_r \ge u_r \; \forall \, r \in CCMinMaxRules$$

Budget rule: $\sum_{c \in Customers} \sum_{\alpha \in Alternatives(c)} \beta_{c,\alpha,r} x_{c,\alpha} \le B_r \; \forall \, r \in BudgetRules$ Max Custom Sum:

$$\sum_{c \in Customers} \sum_{\alpha \in Alternatives(c)} \left( \sum_{o \in OffersInAlternative(\alpha)} \gamma_{o,c,r} \right) x_{c,\alpha} - v_r \le$$

$$M_r \; \forall \, r \in SumCustomRules$$

MinCustomSum:

$$\sum_{c \in Customers} \sum_{\alpha \in Alternatives(c)} \left( \sum_{o \in OffersInAlternative(\alpha)} \gamma_{o,c,r} \right) x_{c,\alpha} + \theta_r \ge$$

$$m_r \; \forall \, r \in SumCustomRules$$

MaxCustomAverage:

$$\sum_{c \in Customers} \sum_{\alpha \in Alternatives(c)} \left( \sum_{o \in OffersInAlternative(\alpha)} (\varepsilon_{o,c,r} - G_r) \right) x_{c,\alpha} - \pi_r \le$$

$$0 \; \forall \, r \in AverageCustomRules$$

MinCustomAverage:

$$\sum_{c \in Customers} \sum_{\alpha \in Alternatives(c)} \left( \sum_{o \in OffersInAlternative(\alpha)} (\varepsilon_{o,c,r} - g_r) \right) x_{c,\alpha} + \omega_r \ge$$

$$0 \; \forall \, r \in AverageCustomRules$$

LP version: $0 \le x_{c,\alpha} \le 1 \; \forall \, c \in Customers, \alpha \in Alternatives(c)$ MIP version: $x_{c,\alpha} \in \{0, 1\} \; \forall \, c \in Customers, \alpha \in Alternatives(c)$ All versions:

$p_r, q_r \ge 0 \; \forall \, r \in CCMinMaxRules$ $v_r, \theta_r \ge 0 \; \forall \, r \in SumCustomRules$ $\pi_r, \omega_r \ge 0 \; \forall \, r \in AverageCustomRules$ Notation:

$x_{c,\alpha}$ decision variable. It is one if alternative $\alpha$ is assigned to customer c.

$s_{c,\alpha}$ the score of alternative $\alpha$ for customer c.

$\delta_{c,\alpha,r}$ the number of times alternative $\alpha$ is incident on rule r for customer c.

$u_r$ minimum number of transactions assigned to rule r.

$v_r$ maximum number of transactions assigned to rule r.

$\beta_{c,\alpha,r}$ budget from rule c that alternative $\alpha$ requires for customer c.

$B_r$ budget available for rule r.

$p_r$ surplus variable for CC capacity constraint r.

$q_r$ slack variable for min CC constraint r.

$\gamma_{o,c,r}$ custom value of offer o for customer c when using custom sum rule r.

$M_r$ maximum value to be met by custom sum rule r.

$m_r$ minimum value to be met by custom sum rule r.

$\epsilon_{o,c,r}$ custom value of offer o for customer c when using custom average rule r.

$G_r$ maximum average value to be met by custom average rule r.

$g_r$ minimum average value to be met by custom average rule r.

$v_r$ surplus variable for max sum custom constraint r.

$\theta_r$ slack variable for the min sum custom constraint r.

$\pi_r$ surplus variable for max sum custom constraint r.

$\omega_r$ slack variable for min average custom constraint r.

The following pseudocode may be used to generate Lagrangian alternatives (85 of FIG. 5A).

```
For each customer c in Chunk
    For each transaction t in CustomerTransactions(c)
        Set PrimalScore(c, t)=TransactionScore(c, t)
        Calculate:

DualScore(c,t)=PrimalScore(c,t)-LagrangianCCMax
            (c,t)+

LagrangianCCMin(c,t)-LagrangianCCBudget(c,t)-

LagrangianMaxCustomSum(c,t)+

LagrangianMinCustomSum(c,t)-

LagrangianMaxCustomAverage(c,t)+

LagrangianMinCustomAverage(c,t)

Set TransactionScore(c, t)=DualScore(c, t)
    Next t
    Alternative A(c)=FindBestAlternativeForCustomer(c)
    If A(c).score>LagrangianCover(c) Then
        Add A(c) to Alternatives(c)
    End If
    For each transaction t0 in CustomerTransactions(c)
        Set TransactionScore(c, t0)=PrimalScore(c, t0)
    Next t0
Next c
```

The following pseudocode describes the FEC internal rule generation, including the sliding time window calculation, in detail:

```
For each FEC rule:
    IF rule is "Max Duplicate Offers" replace the rule with
        one Max rule per distinct offer (split up the proposed
        transactions so each new rule will only contain pro-
        posed transactions of the same offer)
    For each proposed transaction:
        Set the current date to this proposed transaction's
            date. Identify all in-scope proposed transactions,
            whose dates are earlier or equal to the current date,
            that fit into the time interval ending at the current
            date.
        Use this time window to produce one or more internal
            rules for the set of transactions contained in it (a
            Min/Max rule gets split into separate MIN and MAX
            internal rules).
    For each MAX internal rule produced:
        For each in-scope history transaction, while the history
            transaction date is earlier than the latest date in the
            internal rule AND the internal rule MAX constraint is
            greater than zero
            IF the history transaction date is within the rule time
                window, decrement the internal rule MAX con-
                straint
        Group the MAX internal rules according to their MAX
            constraint value
```

For each group:
  For each rule in this group:
    OR the bitmap representing the transactions in this rule with that of every other rule in this group. Whenever the results are the same for one and different for the other, discard the rule that differed (if a set of transactions meets a MAX, any subset of those transaction will too).
  For each MIN internal rule:
    For each in-scope history transaction, while the history transaction date is earlier than the latest date in the internal rule AND the internal rule MIN constraint is greater than zero
      IF the history transaction date is within the rule time window, decrement the internal rule MIN constraint
        IF the internal rule MIN constraint is zero, discard that internal rule The optimization process 80 can find near-optimal, non-fractional assignments. The column-generation approach, combined with the FEC-CSO algorithm for alternatives-generation, is expected to be highly scalable to marketing problems of size, n choose m, where n is typically in the 100-500 range and m may be in the 1-100 range.

The processes described herein, including optimization process 80, can be implemented in digital electronic circuitry, or in computer software, firmware, or hardware, including the structural means disclosed in this specification and structural equivalents thereof, or in combinations of them. The processes can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes described herein, including method steps, can be performed by one or more programmable processors executing one or more computer programs to perform functions of the processes by operating on input data and generating output. The processes can also be performed by, and apparatus of the processes can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer-readable media suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The processes can be implemented in a computing system that includes a back end component (e.g., a data server), a middleware component (e.g., an application server), or a front end component (e.g., a client computer having a graphical user interface or a Web browser through which a user can interact with an implementation of the processes), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. The foregoing are examples for illustration only and not to limit the alternatives in any way.

What is claimed is:

1. A computer-implemented method of allocating marketing offers to a pool of customers, comprising:

receiving a plurality of scores, each of the plurality of scores respectively associated with an offer, from a set of the marketing offers, to a proposed contact, from the pool of customers; and optimizing, using a computer hardware system, an overall campaign score corresponding to a sum of the received plurality of scores, wherein the optimizing generates optimal assignments of the offers to the proposed contacts based upon both a for-each-customer (FEC) constraint and a cross-customer (CC) constraint, the FEC constraint controls communication to an individual customer, and the CC constraint represents resources shared among the pool of customers.

2. The method of claim 1, further comprising conducting a marketing campaign using the optimal assignments of the offers.

3. The method of claim 1, further comprising:

applying linear programming or integer programming to maximize the overall campaign score with respect to the CC constraint; and maximizing the overall campaign score with respect to the FEC constraint.

4. The method of claim 1, wherein
the optimizing includes:
  selecting a first set of assignments for a first group of customers, the first set of assignments providing a maximum sum of scores and complying with the FEC constraint;
  adding the first set of assignments in a pool of assignments; and
  determining a second set of assignments for the first group of customers, the second set of assignments providing a maximum sum of scores and complying with the CC constraint.

5. The method of claim 4, further comprising
iteratively, determining assignments for the first group of customers that comply with the FEC constraint and that maximize the sum of scores; and
determining assignments for the first group of customers that comply with the CC constraint and maximize the sum of scores, until a stop condition is met.

6. The method of claim 5, wherein
the stop condition is met in response to a determination that no new assignments have been added to the pool of assignments.

7. The method of claim 4, wherein
the determining the second set of assignments modifies the scores associated with the assignments in the pool using calculated dual values that indicate whether the assignments comply with the CC constraint, and
the method further comprises:
  transforming scores associated with assignments of the pool by the dual values; and
  selecting from the pool, a third set of assignments for the first group of customers, the third set of assignments providing a maximum sum of scores and complying with the FEC constraint.

8. The method of claim 7, wherein
the determining the second set of assignments applies an optimization technique that includes one or more of linear programming and integer programming, and
the dual values are Lagrangians.

9. The method of claim 1, wherein
the FEC constraint includes one or more of:
  a minimum number of offers,
  a maximum number of offers,
  incompatible offers,
  limits on a number of offers and/or packages sent to a customer over a specific time period, using a particular channel, and of a certain offer type, and
  a specific sequence of offers required for one or more of the customers.

10. The method of claim 1, wherein
the resources represented by the CC constraint include one or more of:
  budget,
  offer capacity,
  channel capacity,
  a minimum average FICO score, and
  a maximum sum of risk score.

11. A computer program product comprising a computer usable storage medium having stored therein computer usable program code for allocating marketing offers to a pool of customers, the computer usable program code, which when executed by a computer hardware system, causes the computer hardware system to perform:
  receiving a plurality of scores, each of the plurality of scores respectively associated with an offer, from a set of the marketing offers, to a proposed contact, from the pool of customers; and
  optimizing an overall campaign score corresponding to a sum of the received plurality of scores, wherein
  the optimizing generates optimal assignments of the offers to the proposed contacts based upon both a for-each-customer (FEC) constraint and a cross-customer (CC) constraint,
  the FEC constraint controls communication to an individual customer, and
  the CC constraint represents resources shared among the pool of customers.

12. The computer program product of claim 11, wherein the computer usable program code further causes the computer hardware system to perform:
  conducting a marketing campaign using the optimal assignments of the offers.

13. The computer program product of claim 11, wherein the computer usable program code further causes the computer hardware system to perform:
  applying linear programming or integer programming to maximize the overall campaign score with respect to the CC constraint; and
  maximizing the overall campaign score with respect to the FEC constraint.

14. The computer program product of claim 11, wherein the optimizing includes:
  selecting a first set of assignments for a first group of customers, the first set of assignments providing a maximum sum of scores and complying with the FEC constraint;
  adding the first set of assignments in a pool of assignments; and
  determining a second set of assignments for the first group of customers, the second set of assignments providing a maximum sum of scores and complying with the CC constraint.

15. The computer program product of claim 14, wherein the computer usable program code further causes the computer hardware system to perform:
  iteratively, determining assignments for the first group of customers that comply with the FEC constraint and that maximize the sum of scores; and
  determining assignments for the first group of customers that comply with the CC constraint and maximize the sum of scores, until a stop condition is met.

16. The computer program product of claim 15, wherein
the stop condition is met in response to a determination that no new assignments have been added to the pool of assignments.

17. The computer program product of claim 14, wherein
the determining the second set of assignments modifies the scores associated with the assignments in the pool using calculated dual values that indicate whether the assignments comply with the CC constraint, and
the computer usable program code further causes the computer hardware system to perform:
  transforming scores associated with assignments of the pool by the dual values; and
  selecting from the pool, a third set of assignments for the first group of customers, the third set of assignments providing a maximum sum of scores and complying with the FEC constraint.

18. The computer program product of claim 17, wherein the determining the second set of assignments applies an optimization technique that includes one or more of linear programming and integer programming, and the dual values are Lagrangians.

19. The computer program product of claim 11, wherein the FEC constraint includes one or more of:
   a minimum number of offers,
   a maximum number of offers,
   incompatible offers,
   limits on a number of offers and/or packages sent to a customer over a specific time period, using a particular channel, and of a certain offer type, and
   a specific sequence of offers required for one or more of the customers.

20. The computer program product of claim 11, wherein the resources represented by the CC constraint include one or more of:
   budget,
   offer capacity,
   channel capacity,
   a minimum average FICO score, and
   a maximum sum of risk score.

21. A computer hardware system for allocating marketing offers to a pool of customers, comprising:
   a storage device having stored therein a plurality of scores, each of the plurality of scores respectively associated with an offer, from a set of the marketing offers, to a proposed contact, from the pool of customers; and
   a processor configured to perform optimizing of an overall campaign score corresponding to a sum of the received plurality of scores, wherein
   the optimizing generates optimal assignments of the offers to the proposed contacts based upon both a for-each-customer (FEC) constraint and a cross-customer (CC) constraint,
   the FEC constraint controls communication to an individual customer, and
   the CC constraint represents resources shared among the pool of customers.

* * * * *